(12) United States Patent
Von Thun et al.

(10) Patent No.: US 8,661,320 B2
(45) Date of Patent: Feb. 25, 2014

(54) INDEPENDENT ORTHOGONAL ERROR CORRECTION AND DETECTION

(75) Inventors: Matthew Von Thun, Colorado Springs, CO (US); Jonathan Mabra, Colorado Springs, CO (US)

(73) Assignee: Aeroflex Colorado Springs Inc., Colorado Springs, CO (US)

( * ) Notice: Subject to any disclaimer, the term of this patent is extended or adjusted under 35 U.S.C. 154(b) by 154 days.

(21) Appl. No.: 13/269,353

(22) Filed: Oct. 7, 2011

(65) Prior Publication Data

US 2013/0091405 A1    Apr. 11, 2013

(51) Int. Cl.
*G11C 29/00* (2006.01)
*H03M 13/00* (2006.01)

(52) U.S. Cl.
USPC ............................ 714/769; 714/758; 714/764

(58) Field of Classification Search
USPC ........................................ 714/764, 769, 758
See application file for complete search history.

(56) References Cited

U.S. PATENT DOCUMENTS

| | | | | |
|---|---|---|---|---|
| 4,866,719 | A * | 9/1989 | Morgan et al. ................. | 714/704 |
| 6,701,468 | B1 * | 3/2004 | Yamazaki et al. ............. | 714/702 |
| 2008/0235558 | A1 * | 9/2008 | Normoyle et al. ............. | 714/757 |
| 2010/0153818 | A1 * | 6/2010 | Bueb ............................. | 714/763 |
| 2010/0269012 | A1 * | 10/2010 | Hazelzet ....................... | 714/753 |
| 2011/0197023 | A1 * | 8/2011 | Iwamitsu et al. ............. | 711/114 |
| 2012/0102379 | A1 * | 4/2012 | D'Abreu et al. ............... | 714/763 |
| 2012/0204082 | A1 * | 8/2012 | Shen et al. ..................... | 714/800 |
| 2012/0221922 | A1 * | 8/2012 | Bennett ......................... | 714/758 |
| 2012/0233498 | A1 * | 9/2012 | Ramaraju et al. ............... | 714/23 |
| 2012/0304039 | A1 * | 11/2012 | Peterson et al. ............... | 714/773 |
| 2013/0024746 | A1 * | 1/2013 | Sharon et al. .................. | 714/766 |
| 2013/0024747 | A1 * | 1/2013 | Sharon et al. .................. | 714/773 |
| 2013/0024749 | A1 * | 1/2013 | Bueb ............................. | 714/773 |
| 2013/0097471 | A1 * | 4/2013 | Jeddeloh ....................... | 714/763 |

OTHER PUBLICATIONS

Feng Qin; Lu, S.; Yuanyuan Zhou, "SafeMem: exploiting ECC-memory for detecting memory leaks and memory corruption during production runs," High-Performance Computer Architecture, 2005. HPCA-11. 11th International Symposium on , vol., No., pp. 291,302, Feb. 12-16, 2005.*
Iyer, R.K.; Nakka, N.M.; Kalbarczyk, Z.T.; Mitra, S, "Recent advances and new avenues in hardware-level reliability support," Micro, IEEE , vol. 25, No. 6, pp. 18,29, Nov.-Dec. 2005.*

* cited by examiner

*Primary Examiner* — Cynthia Britt
(74) *Attorney, Agent, or Firm* — William J. Kubida; Peter J. Meza; Hogan Lovells US LLP

(57) ABSTRACT

A data memory is organized as a logical matrix having multiple virtual data words. Along with the physical representation of the data as being associated with physical memory cells, other virtual data words and their virtual check bits are formed that intersect (logically) with the real data word in a multi-dimensional array. Each of these virtual words can possess errors that can be quickly corrected using independent EDAC methodology. The validity of the virtual word can be used to verify the validity of a single bit in the real word thus correcting multiple bit errors.

25 Claims, 14 Drawing Sheets

| FIXED |
|---|

310:

| $D_n$ | ... | $D_4$ | $D_3$ | $D_2$ | $D_1$ | $D_0$ |
|---|---|---|---|---|---|---|
| $S_1$ | ... | $S_{41}$ | $S_{31}$ | $S_{21}$ | $S_{11}$ | $S_{01}$ |
| $S_{n2}$ | ... | $S_{42}$ | $S_{32}$ | $S_{22}$ | $S_{12}$ | $S_{02}$ |
| $S_{n3}$ | ... | $S_{43}$ | $S_{33}$ | $S_{23}$ | $S_{13}$ | $S_{03}$ |
| $S_{n4}$ | ... | $S_{44}$ | $S_{34}$ | $S_{24}$ | $S_{14}$ | $S_{04}$ |
| $S_{n5}$ | ... | $S_{45}$ | $S_{35}$ | $S_{25}$ | $S_{15}$ | $S_{05}$ |
| $S_{n6}$ | ... | $S_{46}$ | $S_{36}$ | $S_{26}$ | $S_{16}$ | $S_{06}$ |
| ... | ... | ... | ... | ... | ... | ... |
| $S_{nk}$ | ... | $S_{4k}$ | $S_{3k}$ | $S_{2k}$ | $S_{1k}$ | $S_{0k}$ |

| | | | | |
|---|---|---|---|---|
| $dC_{01}$ | $dC_{02}$ | $dC_{03}$ | $dC_{04}$ | $dC_{05}$ | $dC_{06}$ | $dC_{07}$ | ... | $dC_{0k}$ |
| $dC_{11}$ | $dC_{12}$ | $dC_{13}$ | $dC_{14}$ | $dC_{15}$ | $dC_{16}$ | $dC_{17}$ | ... | $dC_{1k}$ |
| ... | ... | ... | ... | ... | ... | ... | ... | ... |
| $dC_{n1}$ | $dC_{n2}$ | $dC_{n3}$ | $dC_{n4}$ | $dC_{n5}$ | $dC_{n6}$ | $dC_{n7}$ | ... | $dC_{nk}$ |

| $sdC_{01}$ | $sdC_{02}$ | $sdC_{03}$ | $sdC_{04}$ | ... | $sdC_{0j}$ |
|---|---|---|---|---|---|
| $sdC_{11}$ | $sdC_{12}$ | $sdC_{13}$ | $sdC_{14}$ | ... | $sdC_{1j}$ |
| ... | ... | ... | ... | ... | ... |
| $sdC_{n1}$ | $sdC_{n2}$ | $sdC_{n3}$ | $sdC_{n4}$ | ... | $sdC_{nj}$ |

| $sC_{01}$ | $sC_{02}$ | $sC_{03}$ | $sC_{04}$ | ... | $sC_{0j}$ |
|---|---|---|---|---|---|
| $sC_{11}$ | $sC_{12}$ | $sC_{13}$ | $sC_{14}$ | ... | $sC_{1j}$ |
| $sC_{21}$ | $sC_{22}$ | $sC_{23}$ | $sC_{24}$ | ... | $sC_{2j}$ |
| $sC_{31}$ | $sC_{32}$ | $sC_{33}$ | $sC_{34}$ | ... | $sC_{3j}$ |
| $sC_{41}$ | $sC_{42}$ | $sC_{43}$ | $sC_{44}$ | ... | $sC_{4j}$ |
| ... | ... | ... | ... | ... | ... |
| $sC_{n1}$ | $sC_{n2}$ | $sC_{n3}$ | $sC_{n4}$ | ... | $sC_{nj}$ |

| FIXED |
|---|
| FIXED |
| FIXED |
| FIXED |
| FIXED |
| |
| |

Fig. 4A

| | $D_n$ | ... | $D_4$ | $D_3$ | $D_2$ | $D_1$ | $D_0$ | | $dC_{n1}$ | ... | $dC_{11}$ | $dC_{01}$ | DETECT | CORRECT |
|---|---|---|---|---|---|---|---|---|---|---|---|---|---|---|
| $S_1$ | $S_{n1}$ | ... | $S_{41}$ | $S_{31}$ | $S_{21}$ | $S_{11}$ | $S_{01}$ | | $dC_{n2}$ | ... | $dC_{12}$ | $dC_{02}$ | | |
| $S_{n2}$ | | ... | $S_{42}$ | $S_{32}$ | $S_{22}$ | $S_{12}$ | $S_{02}$ | | $dC_{n3}$ | ... | $dC_{13}$ | $dC_{03}$ | FIXED | |
| $S_{n3}$ | | ... | $S_{43}$ | $S_{33}$ | $S_{23}$ | $S_{13}$ | $S_{03}$ | | $dC_{n4}$ | ... | $dC_{14}$ | $dC_{04}$ | FIXED | |
| $S_{n4}$ | | ... | $S_{44}$ | $S_{34}$ | $S_{24}$ | $S_{14}$ | $S_{04}$ | | $dC_{n5}$ | ... | $dC_{15}$ | $dC_{05}$ | | |
| $S_{n5}$ | | ... | $S_{45}$ | $S_{35}$ | $S_{25}$ | $S_{15}$ | $S_{05}$ | | $dC_{n6}$ | ... | $dC_{16}$ | $dC_{06}$ | FIXED | PASS 2 |
| $S_{n6}$ | | ... | $S_{46}$ | $S_{36}$ | $S_{26}$ | $S_{16}$ | $S_{06}$ | | $dC_{n7}$ | ... | $dC_{17}$ | $dC_{07}$ | | |
| ... | | | ... | ... | ... | ... | ... | | ... | | ... | ... | | |
| $S_{nk}$ | | ... | $S_{4k}$ | $S_{3k}$ | $S_{2k}$ | $S_{1k}$ | $S_{0k}$ | | $dC_{nk}$ | ... | $dC_{1k}$ | $dC_{0k}$ | | |

| $sC_{n1}$ | ... | $sC_{41}$ | $sC_{31}$ | $sC_{21}$ | $sC_{11}$ | $sC_{01}$ | | $sdC_{n1}$ | ... | $sdC_{11}$ | $sdC_{01}$ |
|---|---|---|---|---|---|---|---|---|---|---|---|
| $sC_{n2}$ | ... | $sC_{42}$ | $sC_{32}$ | $sC_{22}$ | $sC_{12}$ | $sC_{02}$ | | $sdC_{n2}$ | ... | $sdC_{12}$ | $sdC_{02}$ |
| $sC_{n3}$ | ... | $sC_{43}$ | $sC_{33}$ | $sC_{23}$ | $sC_{13}$ | $sC_{03}$ | | $sdC_{n3}$ | ... | $sdC_{13}$ | $sdC_{03}$ |
| $sC_{n4}$ | ... | $sC_{44}$ | $sC_{34}$ | $sC_{24}$ | $sC_{14}$ | $sC_{04}$ | | $sdC_{n4}$ | ... | $sdC_{14}$ | $sdC_{04}$ |
| ... | | ... | ... | ... | ... | ... | | ... | | ... | ... |
| $sC_{nj}$ | ... | $sC_{4j}$ | $sC_{3j}$ | $sC_{2j}$ | $sC_{1j}$ | $sC_{0j}$ | | $sdC_{nj}$ | ... | $sdC_{1j}$ | $sdC_{0j}$ |

| FIXED | | DETECT | FIXED | FIXED | DETECT | DETECT | | | | DETECT | DETECT |
|---|---|---|---|---|---|---|---|---|---|---|---|
| | | CORRECT | | | PASS 2 | PASS 2 | | | | CORRECT | CORRECT |

| $D_0$ | $S_{01}$ | $S_{02}$ | $S_{03}$ | $S_{04}$ | $S_{05}$ | $S_{06}$ | ... | $S_{0k}$ |
|---|---|---|---|---|---|---|---|---|
| $D_1$ | $S_{11}$ | $S_{12}$ | $S_{13}$ | $S_{14}$ | $S_{15}$ | $S_{16}$ | ... | $S_{1k}$ |
| $D_2$ | $S_{21}$ | $S_{22}$ | $S_{23}$ | $S_{24}$ | $S_{25}$ | $S_{26}$ | ... | $S_{2k}$ |
| $D_3$ | $S_{31}$ | $S_{32}$ | $S_{33}$ | $S_{34}$ | $S_{35}$ | $S_{36}$ | ... | $S_{3k}$ |
| $D_4$ | $S_{41}$ | $S_{42}$ | $S_{43}$ | $S_{44}$ | $S_{45}$ | $S_{46}$ | ... | $S_{4k}$ |
| ... | ... | ... | ... | ... | ... | ... | ... | ... |
| $D_n$ | $S_1$ | $S_{n2}$ | $S_{n3}$ | $S_{n4}$ | $S_{n5}$ | $S_{n6}$ | ... | $S_{nk}$ |

| $dC_{01}$ | $dC_{02}$ | $dC_{03}$ | $dC_{04}$ | $dC_{05}$ | $dC_{06}$ | $dC_{07}$ | ... | $dC_{0k}$ |
|---|---|---|---|---|---|---|---|---|
| $dC_{11}$ | $dC_{12}$ | $dC_{13}$ | $dC_{14}$ | $dC_{15}$ | $dC_{16}$ | $dC_{17}$ | ... | $dC_{1k}$ |
| ... | ... | ... | ... | ... | ... | ... | ... | ... |
| $dC_{n1}$ | $dC_{n2}$ | $dC_{n3}$ | $dC_{n4}$ | $dC_{n5}$ | $dC_{n6}$ | $dC_{n7}$ | ... | $dC_{nk}$ |

| $sC_{01}$ | $sC_{02}$ | $sC_{03}$ | $sC_{04}$ | ... | $sC_{0j}$ |
|---|---|---|---|---|---|
| $sC_{11}$ | $sC_{12}$ | $sC_{13}$ | $sC_{14}$ | ... | $sC_{1j}$ |
| $sC_{21}$ | $sC_{22}$ | $sC_{23}$ | $sC_{24}$ | ... | $sC_{2j}$ |
| $sC_{31}$ | $sC_{32}$ | $sC_{33}$ | $sC_{34}$ | ... | $sC_{3j}$ |
| $sC_{41}$ | $sC_{42}$ | $sC_{43}$ | $sC_{44}$ | ... | $sC_{4j}$ |
| ... | ... | ... | ... | ... | ... |
| $sC_{n1}$ | $sC_{n2}$ | $sC_{n3}$ | $sC_{n4}$ | ... | $sC_{nj}$ |

| $sdC_{01}$ | $sdC_{02}$ | $sdC_{03}$ | $sdC_{04}$ | ... | $sdC_{0j}$ |
|---|---|---|---|---|---|
| $sdC_{11}$ | $sdC_{12}$ | $sdC_{13}$ | $sdC_{14}$ | ... | $sdC_{1j}$ |
| ... | ... | ... | ... | ... | ... |
| $sdC_{n1}$ | $sdC_{n2}$ | $sdC_{n3}$ | $sdC_{n4}$ | ... | $sdC_{nj}$ |

| $D_n$ | ... | $D_4$ | $D_3$ | $D_2$ | $D_1$ | $D_0$ |
|---|---|---|---|---|---|---|
| $S_1$ | ... | $S_{41}$ | $S_{31}$ | $S_{21}$ | $S_{11}$ | $S_{01}$ |
| $S_{n2}$ | ... | $S_{42}$ | $S_{32}$ | $S_{22}$ | $S_{12}$ | $S_{02}$ |
| $S_{n3}$ | ... | $S_{43}$ | $S_{33}$ | $S_{23}$ | $S_{13}$ | $S_{03}$ |
| $S_{n4}$ | ... | $S_{44}$ | $S_{34}$ | $S_{24}$ | $S_{14}$ | $S_{04}$ |
| $S_{n5}$ | ... | $S_{45}$ | $S_{35}$ | $S_{25}$ | $S_{15}$ | $S_{05}$ |
| $S_{n6}$ | ... | $S_{46}$ | $S_{36}$ | $S_{26}$ | $S_{16}$ | $S_{06}$ |
| ... | ... | ... | ... | ... | ... | ... |
| $S_{nk}$ | ... | $S_{4k}$ | $S_{3k}$ | $S_{2k}$ | $S_{1k}$ | $S_{0k}$ |

| $sC_{n1}$ | ... | $sC_{41}$ | $sC_{31}$ | $sC_{21}$ | $sC_{11}$ | $sC_{01}$ |
|---|---|---|---|---|---|---|
| $sC_{n2}$ | ... | $sC_{42}$ | $sC_{32}$ | $sC_{22}$ | $sC_{12}$ | $sC_{02}$ |
| $sC_{n3}$ | ... | $sC_{43}$ | $sC_{33}$ | $sC_{23}$ | $sC_{13}$ | $sC_{03}$ |
| $sC_{n4}$ | ... | $sC_{44}$ | $sC_{34}$ | $sC_{24}$ | $sC_{14}$ | $sC_{04}$ |
| ... | ... | ... | ... | ... | ... | ... |
| $sC_{nj}$ | ... | $sC_{4j}$ | $sC_{3j}$ | $sC_{2j}$ | $sC_{1j}$ | $sC_{0j}$ |

| | | DETECT | | DETECT | |
|---|---|---|---|---|---|

| $dC_{n1}$ | ... | $dC_{15}$ $dC_{16}$ $dC_{17}$ ... $dC_{1k}$ | $dC_{01}$ $dC_{02}$ $dC_{03}$ $dC_{04}$ $dC_{05}$ $dC_{06}$ $dC_{07}$ ... $dC_{0k}$ |

(table row layout for dC matrix: columns $dC_{01..0k}$, $dC_{11..1k}$, ..., $dC_{n1..nk}$)

| $sdC_{n1}$ | ... | $sdC_{11}$ | $sdC_{01}$ |
|---|---|---|---|
| $sdC_{n2}$ | ... | $sdC_{12}$ | $sdC_{02}$ |
| $sdC_{n3}$ | ... | $sdC_{13}$ | $sdC_{03}$ |
| $sdC_{n4}$ | ... | $sdC_{14}$ | $sdC_{04}$ |
| ... | ... | ... | ... |
| $sdC_{nj}$ | ... | $sdC_{1j}$ | $sdC_{0j}$ |

INDEPENDENT ORTHOGONAL ERROR CORRECTION AND DETECTION

BACKGROUND OF THE INVENTION

1. Field of the Invention

Embodiments of the present invention relate, in general, to integrated circuit dynamic memories and more particularly to methods and architectures for detecting and correcting errors in dynamic memories.

2. Relevant Background

Semiconductor memories are typically laid out in rows and columns. Thus, a memory address can be thought of as a means by which to select a cell located at a particular row and column at which bits of information are maintained.

Memories are typically sub-divided into banks. Banks include an array of memory cells with multiple rows and columns. Banks also typically include driver, amplifier and pre-charge circuitry required for reading and writing to the memory. A memory can therefore use lower total power by confining an individual read or write operation to one bank or a limited number of banks. This will allow the memory to only turn on a small number of driver, amplifier, or pre-charge circuits at one time.

As the density of integrated circuit memories increases, the area of each individual bit storage element in the memory correspondingly decreases. These smaller bit cells are more vulnerable, and the vast number of bits increases the statistical probability that there will exist among the vast array of bit elements individual memory cells that due to manufacturing variations and other environmental effects may not retain their memory values as well as the average memory cell in the array. It is therefore possible that during the normal course of operation these weak array elements will flip to the opposite memory state and corrupt the data stored in the memory.

It is also a well documented fact that bits can be flipped by the rare occurrence of a terrestrial cosmic ray that interacts with a memory cell. When the memory is used in a harsh environment such as high altitude or even space environments, the problem is greatly exacerbated as the number of cosmic ray interactions increases dramatically. Therefore, it is a common practice within the semiconductor memory industry to include Error Detection And Correction (EDAC) circuitry within a memory. Multiple EDAC techniques are known in the art. These include repetition codes, parity bits, checksums, cyclic redundancy checks, cryptographic hash functions, error correcting codes, automatic repeat request, and hybrid schemes. Indeed, error correcting codes include GCH code, Constant-weight code, convolutional code, group codes, Golay codes, Goppa code, Hagelbarger code, Hamming code, Lexicographic code, low-density parity check code, LT code, Raptor code, Reed-Solomon code, Reed-Muller code, Tornado code, turbo code, and the like. Generally such techniques use additional check bits. These check bits hold redundant information that can be used to correct the memory when one or more bits in a data word is corrupted.

According to one method of EDAC known in the art, data to be stored is provided to the EDAC. The EDAC then generates check bits based on the data value. The check bits are then stored along with the data or, as in this example, the check bits are used along with the data to form a code word which is then stored along with the data. To check the data, the EDAC reads the code word from the memory and recalculates the check bits based on the data portion of the code word. The recalculated check bits are then compared to the check bits in the code word to determine if there is a match. If a match exists, then the data in the code word is correct; if not, an error exists.

In other methods, the check bits themselves are stored along with the data and are used to determine whether an error exists, and if possible, correct the error. However, the effectiveness of these EDAC circuits is limited by the fact that when more than one bit in a given data word is corrupted (a condition known as a multi-bit error (MBE) or multi-bit upsets (MBU)), an increasingly large number of check bits are required in order to contain enough redundant information to correct the errors. For example, a Single Error Correcting and Double Error Detecting (SECDED) hamming code requires m parity bits for every $2^m$-m-1 data bits.

When MBEs are common, the number of redundant check bits included on the chip may need to be equal to or even greater than the number of actual memory bits and this overhead will limit the achievable density of the memory device. Moreover, when a cosmic ray interacts with a dense memory device, a single interaction will likely flip multiple memory bits. Since memories are constructed in ordered arrays of rows and columns, it is likely that even a single cosmic ray or heavy ion strike could cause a MBE.

A variety of EDAC techniques and circuits are available, but to correct more than one error in a word, a large overhead of check bits is required. Thus, the memory must grow substantially to provide storage for the increasing number of check bits. Eventually, such growth is prohibitive, thus limiting the memory's ability to self correct. Moreover, there is a performance penalty for multiple word bit correction. An EDAC designed to correct multiple errors is more complex and introduces more latency into the memory access time than those that correct fewer errors. In some applications such as telecommunications, this latency does not affect performance (for example, in a radio communication, it is not significant that a transmission is delayed by a fraction of a second to correct errors); in other applications, performance on a cycle-by-cycle basis is critical. Thus, the latency of error correction during a single cycle can be significant hit on performance.

Therefore, a need exists for an efficient method to detect and correct multiple errors in a semiconductor memory. Further, a need exists to develop an integrated method of error detection and correction that minimizes overhead yet improves memory reliability. These and other limitations of the prior art are resolved by one or more embodiments of the present invention, described hereafter by way of example.

SUMMARY OF THE INVENTION

One embodiment of the present invention codes redundant information both within the data word itself as well as within other unrelated locations in the memory to create multiple sets of independent redundant information for each data word. This is accomplished by organizing the memory as a logical matrix having multiple virtual data words. Along with the physical representation of the data as being associated with physical memory cells, other virtual data words and their virtual check bits can be formed that intersect (logically) with the real data word. Each of these virtual words can possess errors that can be quickly corrected. The validity of the virtual word can be used to verify the validity of a single bit in the real data word.

Thus, one feature of the present invention is that a single error can be detected and corrected in one pass, and an extreme MBE that affects many bits in a data word can be corrected in multiple passes using known error correction algorithms. Correcting a single error in one data or virtual word would lead to correcting a part of a multi-bit error in another word.

Moreover, one embodiment of the present invention allows for multiple dimensions of virtual word applications. Thus, for further redundancy, sets of virtual data words can be established. The present invention is multidimensional.

In addition and according to one method embodiment of the present invention, a fast data coherency scheme can keep track of and update all of the independent EDAC words that are impacted by a user's intentional change to a memory location. Also, the independent (non-data word) redundant EDAC information is continually cleaned and updated in a method that requires no user interaction and can occur while the user is reading and/or writing data to the memory.

In another embodiment of this invention, the bit spacing requirement of the non-data words is such that a single ion strike will be prevented from creating MBEs in both the data and non-data words. Therefore, the present invention allows for the detection and correction of MBEs with a much smaller overhead in redundant check bits than existing EDAC schemes.

In another embodiment of this invention, the virtual words can be of varying sizes and can be verified independent of one another.

The features and advantages described in this disclosure and in the following detailed description are not all-inclusive. Many additional features and advantages will be apparent to one of ordinary skill in the relevant art in view of the drawings, specification, and claims hereof Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 3A depicts a memory matrix data array showing multiple bit errors with two errors in data word according to one embodiment of the present invention;

FIG. 3C depicts the memory matrix data array in FIG. 3A with the two errors in the data word fixed by correcting the virtual data word and as shown in FIG. 3B;

FIG. 4A depicts a memory matrix data showing multiple bit errors with more than two errors in the data word according to one embodiment of the present invention;

FIG. 4D depicts the memory matrix data array in FIG. 4A with three passes of continuous scrub;

FIG. 5A depicts a memory matrix data array showing multiple errors in the data word and virtual data words according to one embodiment of the present invention;

FIG. 5C depicts the memory matrix data array in FIG. 5A showing that double error data are detectable by using both the detected errors in the data word and virtual data words;

Figure 1:
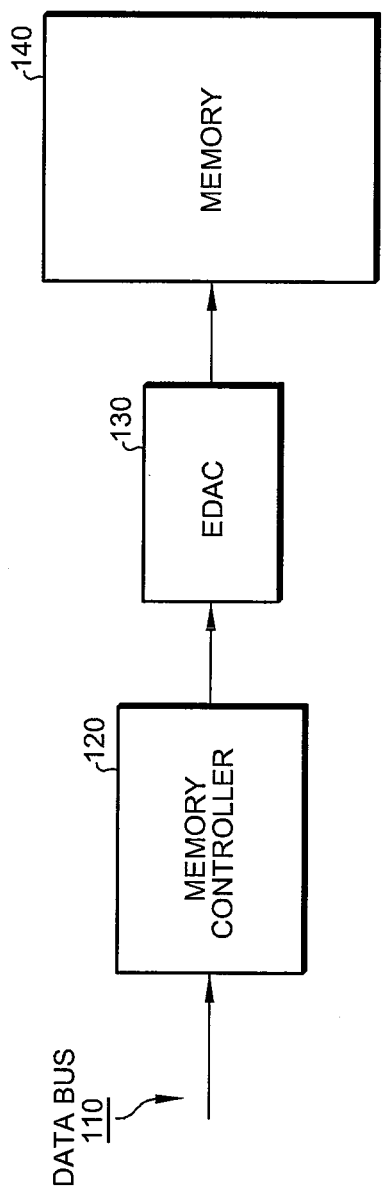
FIG. 1 shows one embodiment of a memory storage and access system according to the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Included in the description are flowcharts depicting examples of the methodology which may be used to correct and/or detect multiple memory bit errors. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

For consistency purposes, standard exemplary meanings are proposed for certain terms used herein. However, usage of these terms are not intended to be limited by the language of these definitions but as should be apparent to those skilled in the art. The present invention is further not intended to be limited by the usage of these terms as defined but as should be apparent to those skilled in the art.

Accordingly, data word is the bit or bits associated with an actual word that the user is attempting to access or store in the memory. Scrub word or virtual data word is any word and the associated check bits upon which an EDAC or ECC scheme is employed and that is not the actual word that the user is attempting to directly access or store in the memory. Orthogonal virtual data word is any scrub word that contains one bit of the original use data word. Parallel virtual data word is a scrub word that does not contain data from the given data word but is comprised of portions of an orthogonal scrub word. This word can be used in combination with a scrub word to identify and correct errors that would be otherwise be undetectable. A parallel virtual word can be made of completely random bits in the memory or it can be another true data word.

FIG. 1 shows one embodiment of a memory storage and access system according to the present invention. Memories 140 are typically sub-divided into banks or blocks. These banks include an array of memory cells with multiple rows and columns and are generally associated with one or more drivers, an amplifier and pre-charge circuitry as needed for reading data from and writing data to memory. By limiting read and write operations to one bank in the memory the total power usage can be minimized.

The memory controller 120, which is coupled to the data bus 110 upon which data is conveyed, is a digital circuit which manages the flow of data going to and from the main memory 140. Memory controllers contain the logic necessary to read and write to a memory. Memories such as a dynamic random access memory (DRAM) requires refresh by sending current through the entire device. Without constant refreshes, DRAM will lose the data written to it as the capacitors leak their charge within a fraction of a second. Reading and writing to a memory is facilitated by use of multiplexers and demultiplexers, by selecting the correct row and column address as the inputs to the multiplexer circuit, where the demultiplexer on the memory can select the correct memory location and return the data (once again passed through a multiplexer to reduce the number of wires necessary to assemble the system). It is understood that a memory can additionally refer to SRAM, NAND Flash, NOR Flash, or some other form of memory.

Data bus 110 width is the number of parallel lines available to communicate with the memory cell. Memory controllers' bus widths range from 8-bit in earlier systems, to 512-bit in more complicated systems and video cards. However, any number of bits can be used for the bus, including the serial 1-bit such as in SPI or USB. Interposed between the memory controller 120 and main memory 140 is an EDAC module 130. As previously discussed, electrical or magnetic memory can be altered by interference resulting in a single bit of memory to flip to the opposite state. This problem can be mitigated by using memory modules that include extra memory bits, the record parity or error correcting code, managed by a memory controller. The EDAC module 130 prepares and manages these extra memory bits.

Embodiments of the present invention utilize a plurality of independent EDAC words to cross-check single or multiple error detection, and single or multiple error correction. Data words can be organized into a logical array along with their associated orthogonal virtual data words. As used in the present invention an orthogonal virtual data word is a virtual data word that is logically created to intersect with the data word undergoing correction, be it a physical data word or another virtual data word. The organization of the data words and virtual data words is multi-dimensional meaning that the array can be of 2 dimensions, 3 dimensions or of any other degree of dimensionality needed to correct the MBEs. As more dimensions are added, the robustness of the data correction scheme increases.

Moreover, multiple types of EDAC schemes can be incorporated to reduce bit storage overhead and to increase the robustness of the invention. For example, the data word could be evaluated using a SECDED Hamming code, while the first set of orthogonal virtual data words is evaluated by a Reed-Solomon scheme that can correct 7 errors in a single word, while yet a third set of orthogonal virtual data words is evaluated by a simple parity check that identifies a single bit error but cannot correct any error.

The separate EDAC engines can run in parallel to achieve a higher error correction efficiency. The logical construction of the array removes or minimizes a concentration of MBE due to a physical altercation of the memory. For example, if a sector of the memory was damaged by some physical interchange with the environment, any error correction relying or tied to the physical makeup of the memory would be limited. By logically separating the bits of the virtual words used in the error correction scheme of the present invention, local memory damage, as it impacts error correction, is reduced.

The present invention further manages data coherency with the logically created EDAC words while the real data is being read and written to data locations. While the virtual data words are indeed virtual in their makeup, they do use bits that are associated with real data words. Thus, as errors are corrected the coherency between the various words is maintained. Just as separate EDAC engines and schemes can be ascribed to each orthogonal set of virtual data words, each set of virtual data words can be of an independent size unrelated to or constrained by the original data word. While larger data words require more memory, the memory allocation of larger virtual data words is more efficient. And since the EDAC of the virtual data words is independent of user access to the physical data word, an EDAC running in the background can run on a larger data word, 64 bit for example, while the actual data word and system operate on an 8 bit word.

Accordingly, embodiments of the present invention reduce the number of EDAC check bits required to detect and correct multi-bit errors as well as improve the ability to detect and correct multi-bit errors. All of this is accomplished without imparting any detrimental impact on a user's ability to access data.

Figure 2:
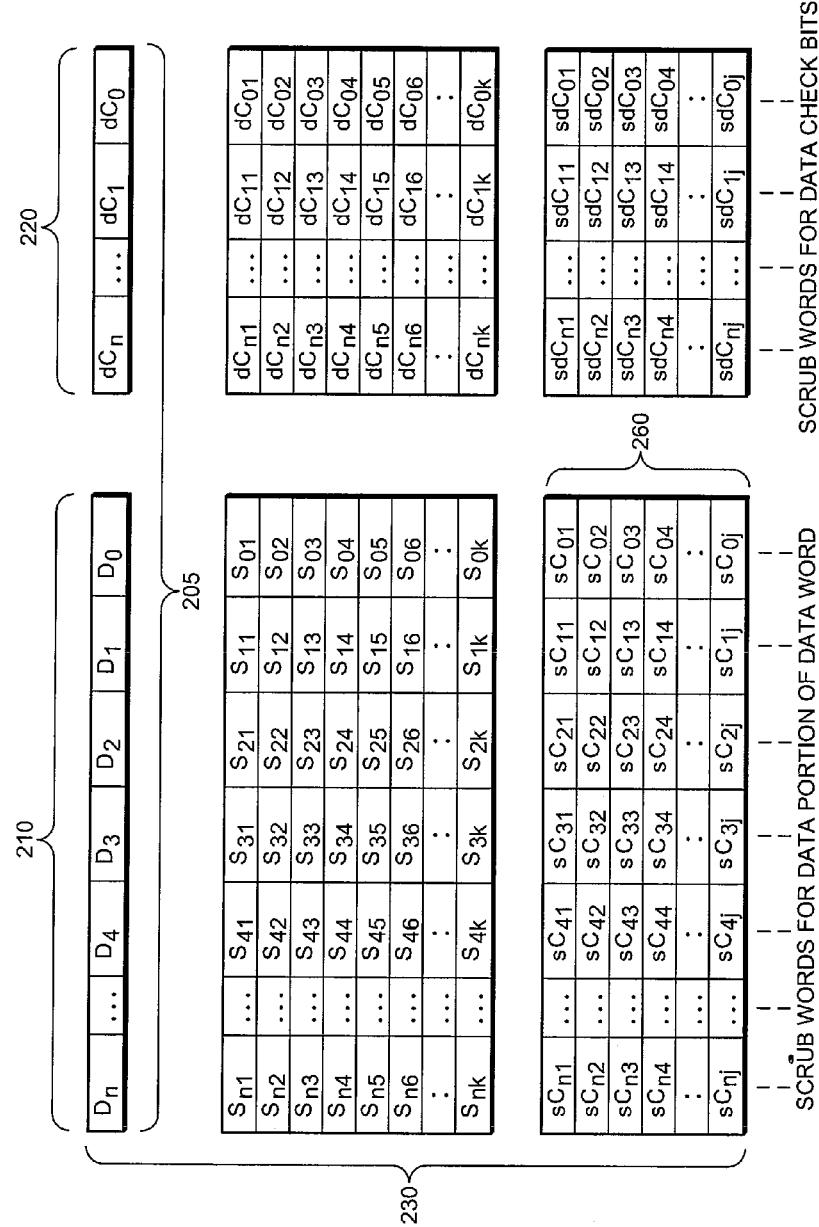
FIG. 2 shows a memory matrix data array used to correct multiple bit errors in a data word according to one embodiment of the present invention.

FIG. 2 shows one example of a logical array in which orthogonal and parallel virtual data words are utilized to correct MBEs. In this example, data words, such as 205, are comprised of a data portion, such as $D_0$-$D_n$ 210, and a check bit portion, such as $dC_0$-$dC_n$ 220. Each bit in the data word is associated with a corresponding orthogonal scrub (virtual) word 230 that is comprised of one bit of the data word plus k+j other bits. And the orthogonal virtual data word 230 is also associated with its own check bit portion 260.

For example, data bit $D_0$ is associated with the orthogonal virtual data word comprised of bits $D_0$, $S_{01}$, $S_{02}$, $S_{03}$, $S_{04}$, $S_{05}$ ... $S_{0k}$, $sC_{01}$, $sC_{02}$, $sC_{03}$, $sC_{04}$, ..., $sC_{0j}$. Thus each bit in the data word, $D_0$ ... $D_n$, $dC_n$ ... $dC_0$, is associated with a unique orthogonal virtual data word. Note that while the data word 205 has a physical relationship to the memory cells in the data array, i.e. the data bits may be adjacent to one another, the bits of the orthogonal virtual data word may be physically dispersed while logically related. Also, note that while the array structure would allow each row in the array to represent a unique data word, it is not a requirement to do so, and thus, the data words can be logically scrambled among a plurality of scrub bits to enhance the robustness of the EDAC scheme.

Figure 3A:
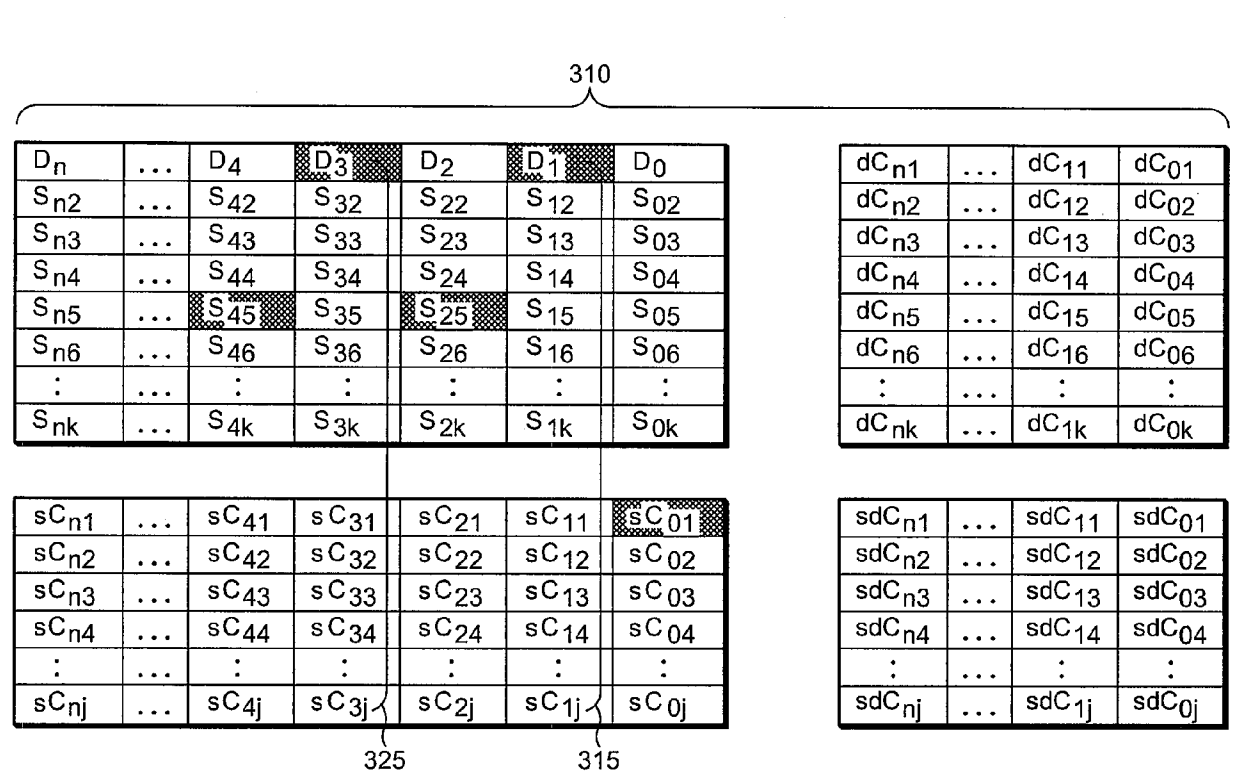

To better understand the EDAC methodology of the present invention, consider the same logical array of FIG. 2 but with data words having multiple bit errors. FIG. 3A thus shows the same logical array of FIG. 2 but in which various bits throughout the matrix have been identified to be in error. As the EDAC circuitry of the present invention is applied, the data word 310 is discovered to contain two data bit errors, $D_1$ and $D_3$. When two errors are detected, the EDAC scheme is incapable of correcting both errors. But each bit of the data word 310 is also associated with an orthogonal and logically created orthogonal virtual data words, such as 315 and 325. The two erroneous bits $D_1$ and $D_3$ of the data word 310 are associated with a first orthogonal virtual data word 315 and a second orthogonal virtual data word 325 respectively. Note that the bits of each orthogonal virtual data words 315 and 325 have a single error, that error being the bit error in the original data word 310. By applying a Single Error Correction Double Error Detection (SECDED) scheme, the errors found in the virtual data words can easily be corrected. By correcting these single bit errors, the multiple errors in the original data word are also corrected.

Figure 3B:
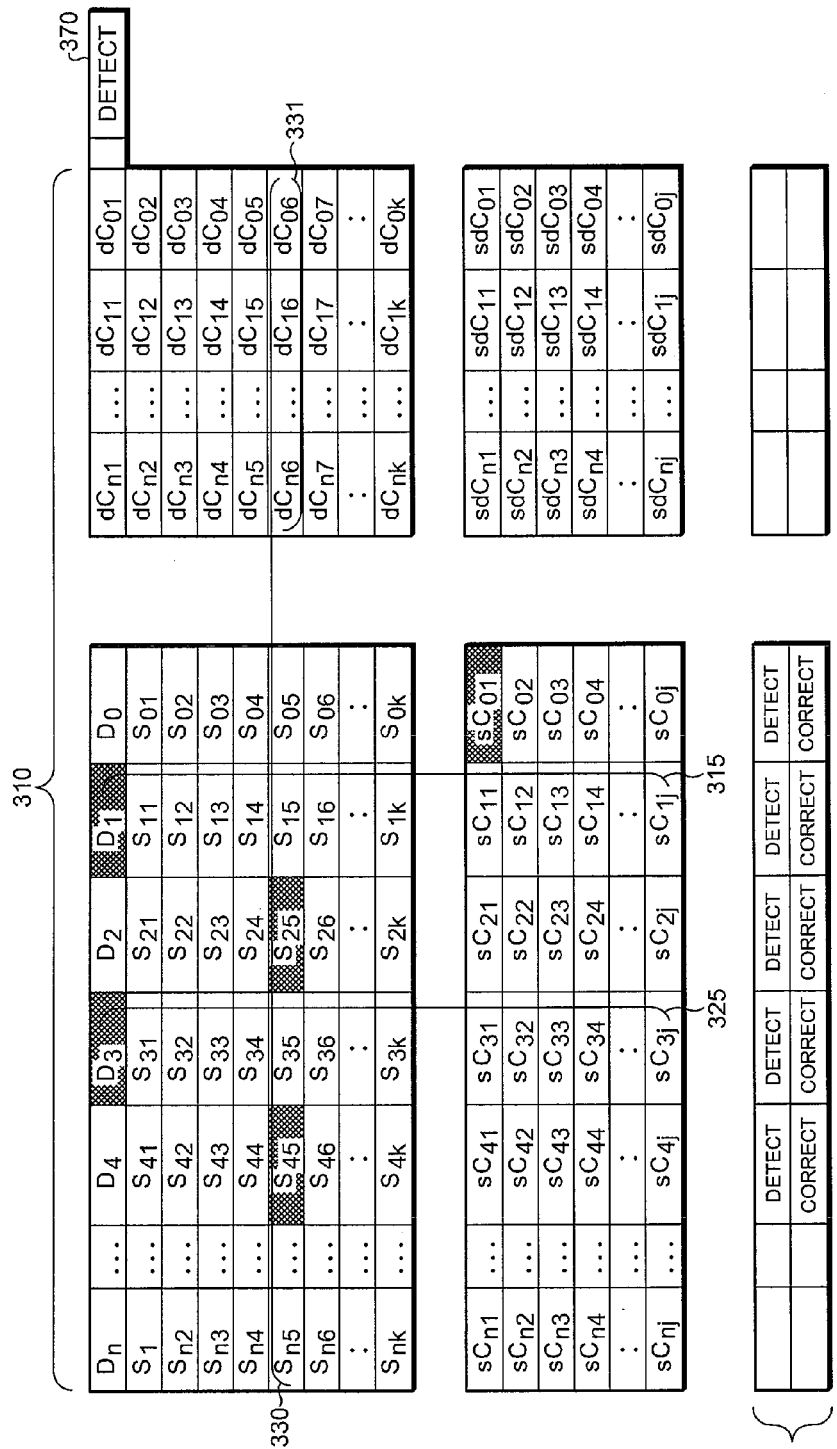
FIG. 3B depicts the memory matrix data array in FIG. 3A with the errors being detected and corrected using the virtual data words and check bit portions.

More specifically, referring to FIG. 3B, when EDAC is applied to the data word 310, detection result 370 shows it is able to detect two errors but is unable to fix these errors. However, the widely separated bits in the orthogonal virtual data words 315 and 325 have only one error per word and can therefore be both detected and corrected as shown in detection result 380.

Referring to FIG. 3C, EDAC loops through the memory continuously in the background and will clean all the data bits in data word 310 found to be in error. Thus, the error correction process of the virtual data words is transparent to the user's access to the actual data words.

As the bits are corrected, data coherency must be considered. If each row in the matrix represents an independent data row, the process of fixing bit errors in the various virtual words will affect the data word. For example, as errors in bit $S_{45}$ and $S_{25}$ are fixed, the bits of parallel virtual data word 330 are affected, as is the corresponding check bit portion 331. To maintain coherency, the data words and check bits are written to a scratch pad memory (not shown) wherein a new check bit portion is calculated. Once fixed, the new data portion and the new check bit portion replaces the corrupt data word. A coherency circuit is included in the present invention to address the issue of a user request for data being issued while the data words are being corrected, but before the correction is completed and regeneration of the check bits is performed.

Figure 4A:
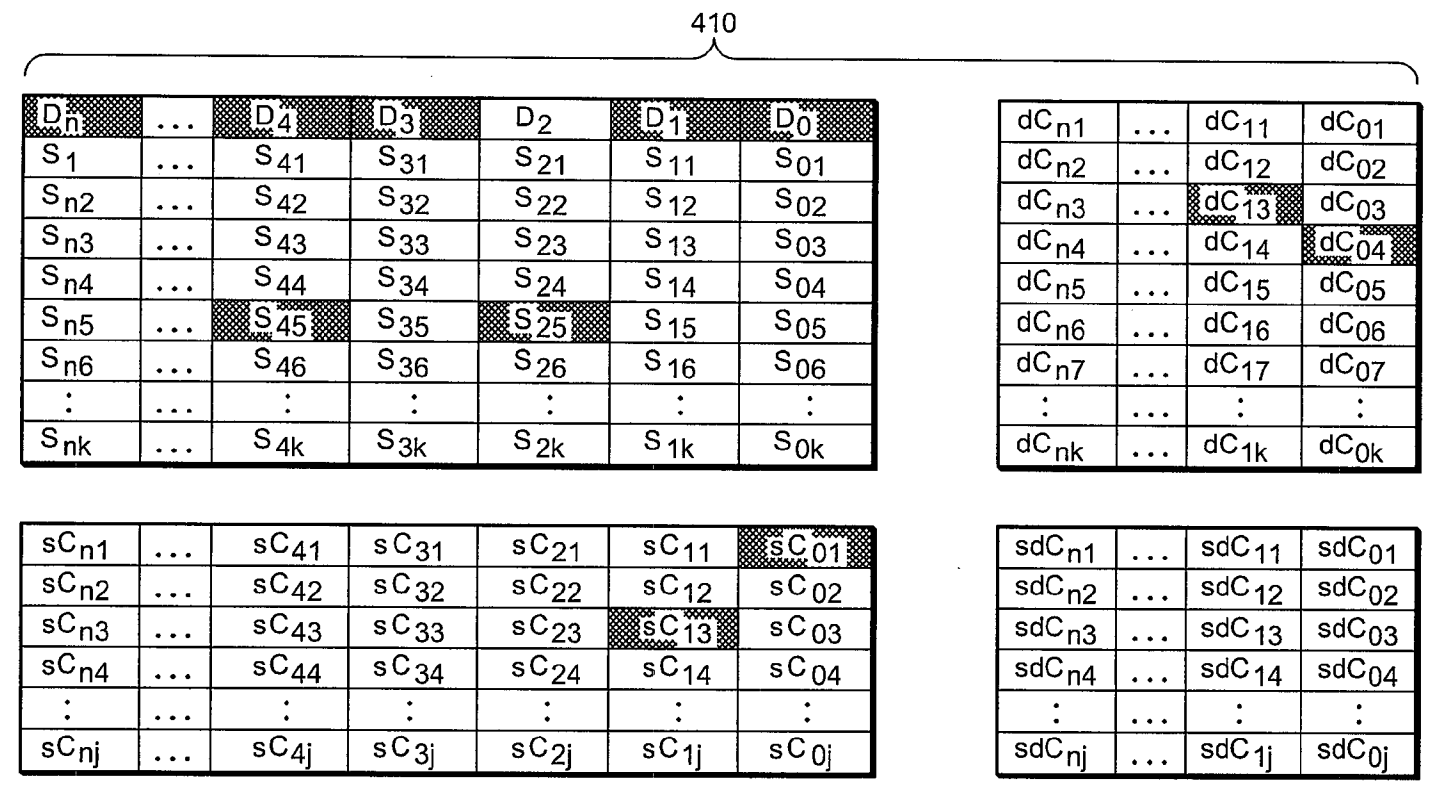

Indeed, there are situations in which more than two errors exist in a single data word. In such a situation, the SECDED scheme cannot correct or detect which bits in the word are in error. Since other errors likely exist in the memory, the virtual words, created from the bits housed in the memory cells, may also include multiple errors. FIG. 4A shows such an example of a virtual memory matrix having multiple errors according to one embodiment of the present invention.

In this example, the original data word 410 has several errors. As shown, bit $D_0$, $D_1$, $D_3$, $D_4$, and $D_n$ contain errors. In addition, bits $S_{45}$, $S_{25}$, $sC_{01}$, $sC_{13}$, $dC_{13}$ and $dC_{04}$ also contain errors.

Figure 4B:
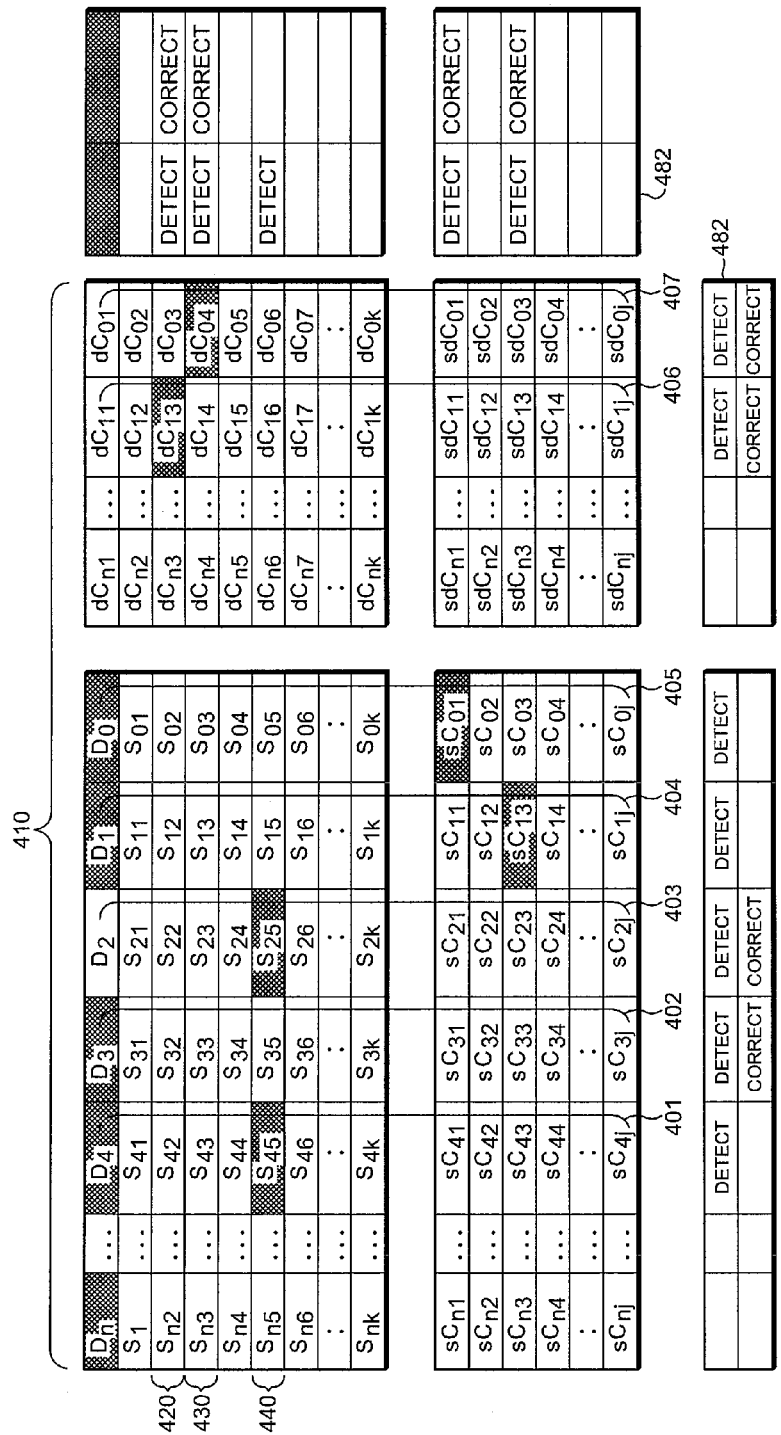
FIG. 4B depicts the memory matrix data array in FIG. 4A with one pass of continuous scrub.

FIG. 4B depicts the memory matrix data array in FIG. 4A with one pass of continuous scrub.

Referring to FIG. 4B, detection result 482 shows that EDAC is able to detect and correct the error bits in parallel virtual data words 420 and 430 and orthogonal virtual data words 402, 403, 406, and 407, as there is only one error bit in the corresponding data or virtual data words. EDAC is only able to detect errors in parallel virtual data word 440 and orthogonal virtual data words 401, 404, and 405 because there are two error bits in the corresponding data or virtual data words. EDAC is unable to detect any errors in the data word 410 because it contains more than two error bits.

Figure 4C:
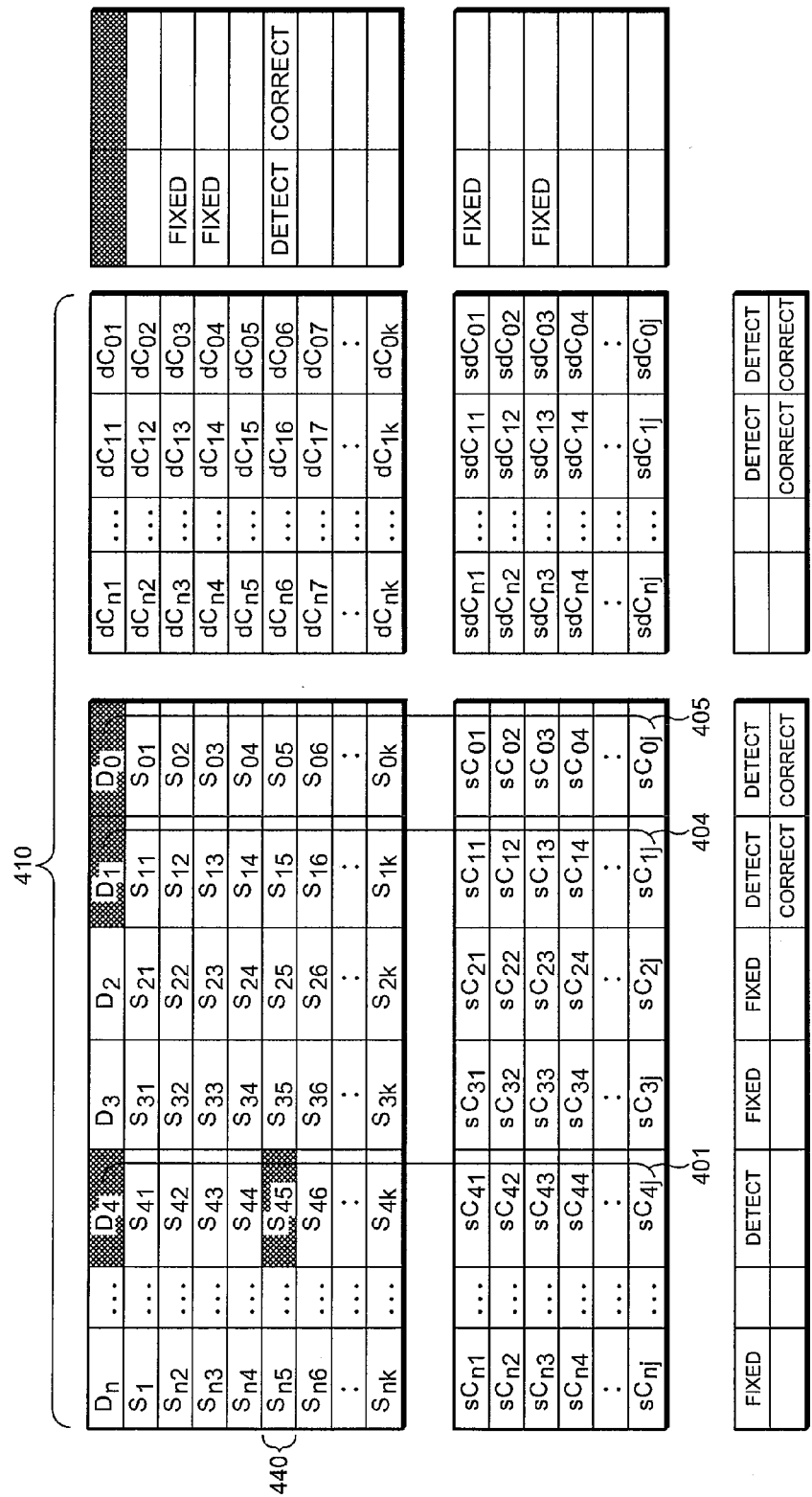
FIG. 4C depicts the memory matrix data array in FIG. 4A with two passes of continuous scrub.

FIG. 4C depicts the memory matrix data array in FIG. 4A with two passes of continuous scrub.

Referring to FIG. 4C, bits $D_3$, $S_{25}$, $dC_{13}$, $dC_{01}$, $sC_{13}$, and $sC_{04}$ have been corrected by the previous pass of continuous scrub. Detection result 483 shows that EDAC is able to detect and correct the error bits in parallel virtual data word 440 and orthogonal virtual data words 404 and 405, of which errors were previously only able to be detected. EDAC is still only able to detect errors in orthogonal virtual data word 401. EDAC is still unable to detect any errors in the data word 410 because it still contains more than two error bits.

FIG. 4D depicts the memory matrix data array in FIG. 4A with three passes of continuous scrub.

Referring to FIG. 4D, detection result 484 shows that EDAC is able to detect and correct $D_4$.

Therefore, referring to FIGS. 4A to 4D, it can be seen that each of the bits associated with a virtual word orthogonal to the original data word 410 can be isolated so as to be a data word or virtual data word with a single error. In such a case, the single error can be detected and corrected. By implementing a continuous scrub of the data in the background, the error in the scrub words can be corrected and thus, when appropriate, the errors in the original data word, however numerous, can be corrected.

In an isolated example, note that bit $S_{45}$ is associated with two errors in both dimensions. According to a SECDED scheme, the errors could not be corrected in a single cycle. However, the error found in $S_{25}$ can be corrected. Upon its correction, the erroneous bit in position $S_{45}$ can be resolved and ultimately the bit $D_4$ corrected.

It is possible that a bit error combination can exist such that a single data bit error cannot be isolated. However, using the SECDEC methodology of the present invention, it is possible to identify the exact location of the errors. Once isolated, the errors can be fixed by a variety of methods. FIGS. 5A to 5D depict such a situation according to one embodiment of the invention.

Referring to FIG. 5A, the memory matrix data array contains bit errors in bits $D_3$, $D_1$, $S_{35}$, and $S_{15}$.

Figure 5B:
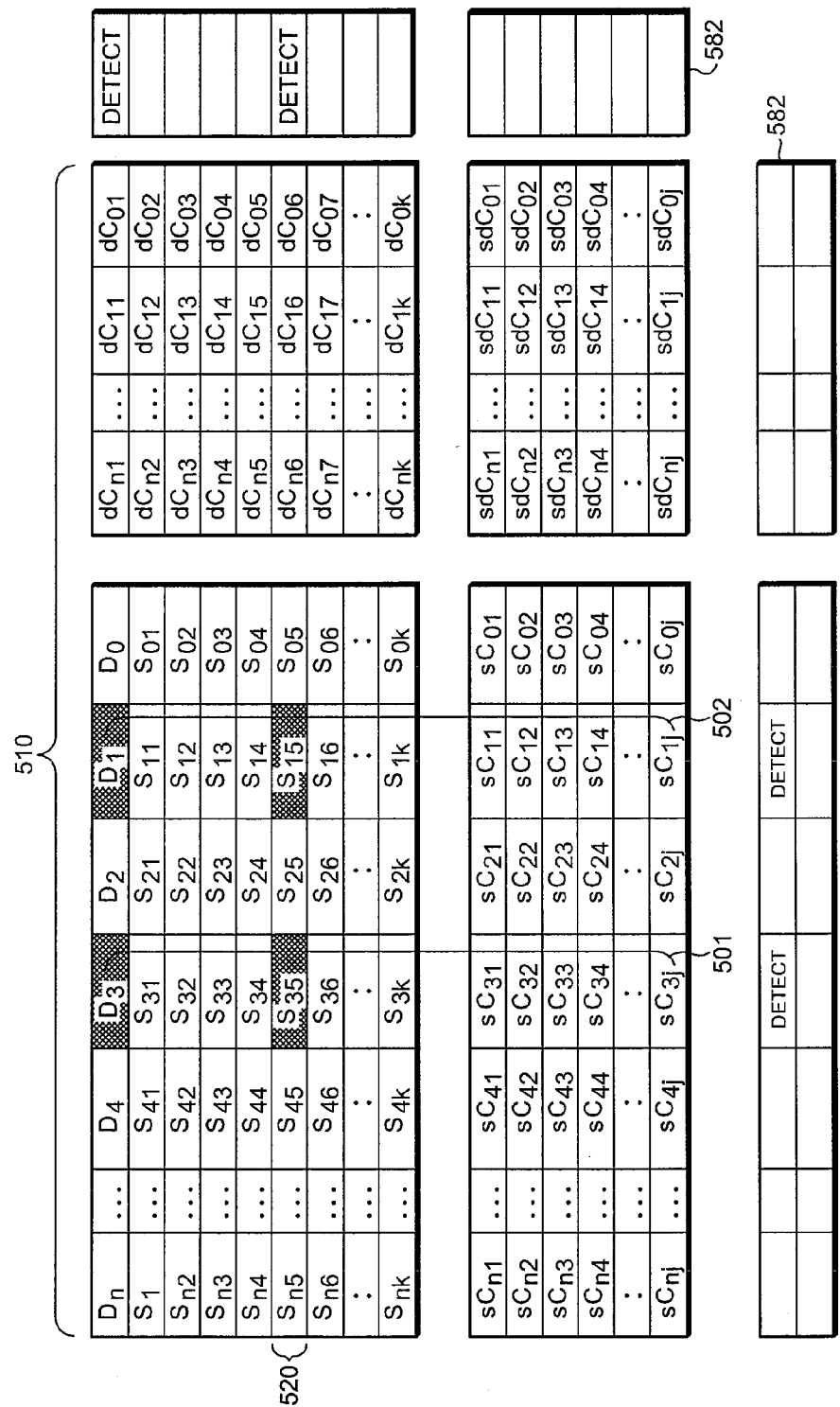
FIG. 5B depicts the memory matrix data array in FIG. 5A after one pass of continuous scrub showing that the multiple bit errors are detected but not correctable.

Referring to FIG. 5B, detection result 582 shows that EDAC is able to detect but unable to correct the errors because the particular arrangement of the error bits is such that there are two errors in each data word 510 and parallel virtual data word 520 and each orthogonal virtual data words 501 and 502. Therefore, in all cases only double errors are observed.

However, although scrubbing passes on individual data word and virtual data words are not able to correct the bits, the data can be used together to identify where the errors are located. Referring to FIG. 5C, the particular arrangement of bit errors is such that there are four detected error words for the four bit errors.

Figure 5D:
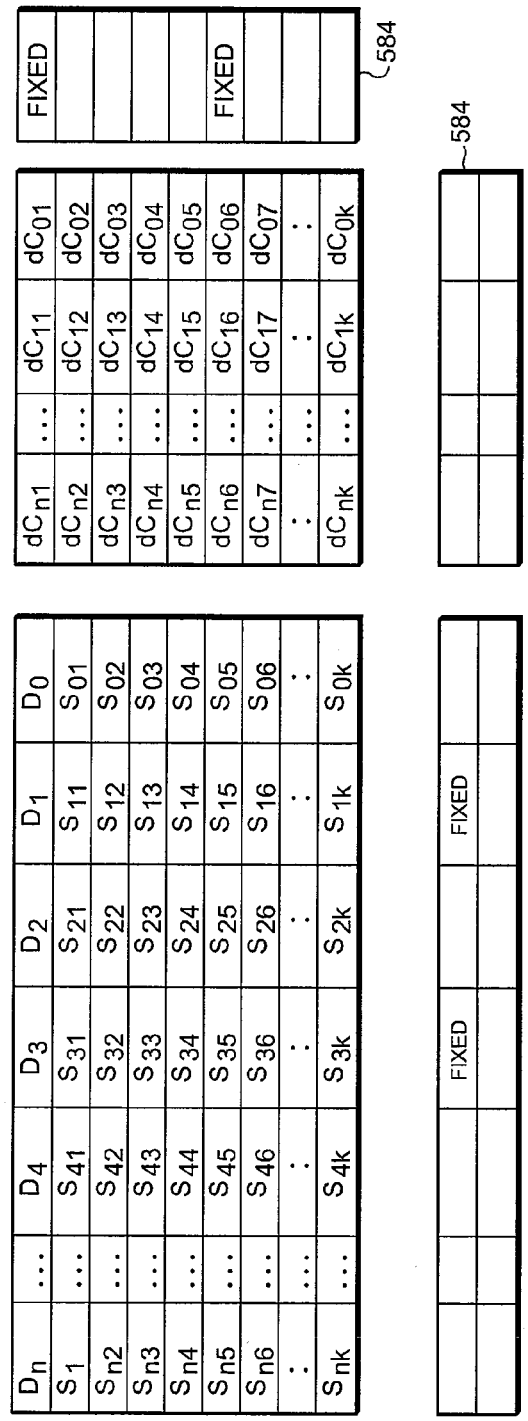
FIG. 5D depicts the memory matrix data array in FIG. 5A showing that the double error data in FIG. 5C will always be at the cross-section of the data word and virtual data words and thus can be identified and fixed.

Referring to FIG. 5D, result 584 shows that the double errors will always be at the cross-section of the highlighted rows and columns and thus can be identified and fixed.

As suggested before, the present invention is not limited to a 2 dimensional array. Indeed, one advantage of the invention is that it is multidimensional. Thus, multiple dimensions can be added to ensure redundancy. Each EDAC layer can operate at a different frequency and use a different correction technique.

Embodiments of the present invention utilize independent busses to access the memory in order to provide the user with both fast and low power access to the memory while at the same time correcting multiple bit errors in the memory. Using at least two independent paths by which to access the memory, the error correction process can occur without impeding user data access. In such an embodiment, one path is used to read and write data by the user and perform EDAC operation on a physical data word. This bus is referred to herein as the data bus. A secondary bus, referred to herein as the scrub or virtual bus, does not organize data on the same data boundaries as the data bus. That is, each word accessed via the scrub bus can contain no more than one bit from any given data word accessed by the data bus.

Since the correction process of the virtual word bits occurs in the background, user access to the data words is not hampered. Indeed, the correction process can be managed so as to occur during a period when data access is low or unlikely, thus, increasing the chances that a coherency challenge would not occur.

It is also advantageous to create virtual data words that are characterized by large physical distances between individual data bits. The virtual data word is comprised of actual data bits housed at memory cell locations. To minimize the potential of a single physical disruptive event affecting multiple virtual data words due to adjacent memory locations, one or more logical algorithms are used to disperse the virtual bits throughout various memory locations.

By using a separate virtual or scrub bus for each virtual dimension of the EDAC matrix, each bus can operate at a different frequency. While the data bus preferably runs at a high frequency to interact with the user, the virtual buses can operate at a lower frequency and be related to the expected probability of an error event occurring. Thus, power is saved by managing the rate by which background error detection and correction occurs.

In addition, each bus can use different EDAC techniques. For example, the data bus can use SECDED, parity check, or any other form of EDAC schema and maximize its interaction with the user. Thus, it can employ a high frequency EDAC technique using a small word size. The virtual words can be of varying size. Indeed, using a larger word size for the virtual words increases memory efficiency. Also, while different EDAC techniques can be used on the various dimensions of the virtual EDAC matrix, the fact that the bits comprising the virtual words are highly dispersed and that the words are orthogonal to each other makes it likely that a simple SECDED technique employed on each dimension can result in an efficient MBE correction.

Figure 6:
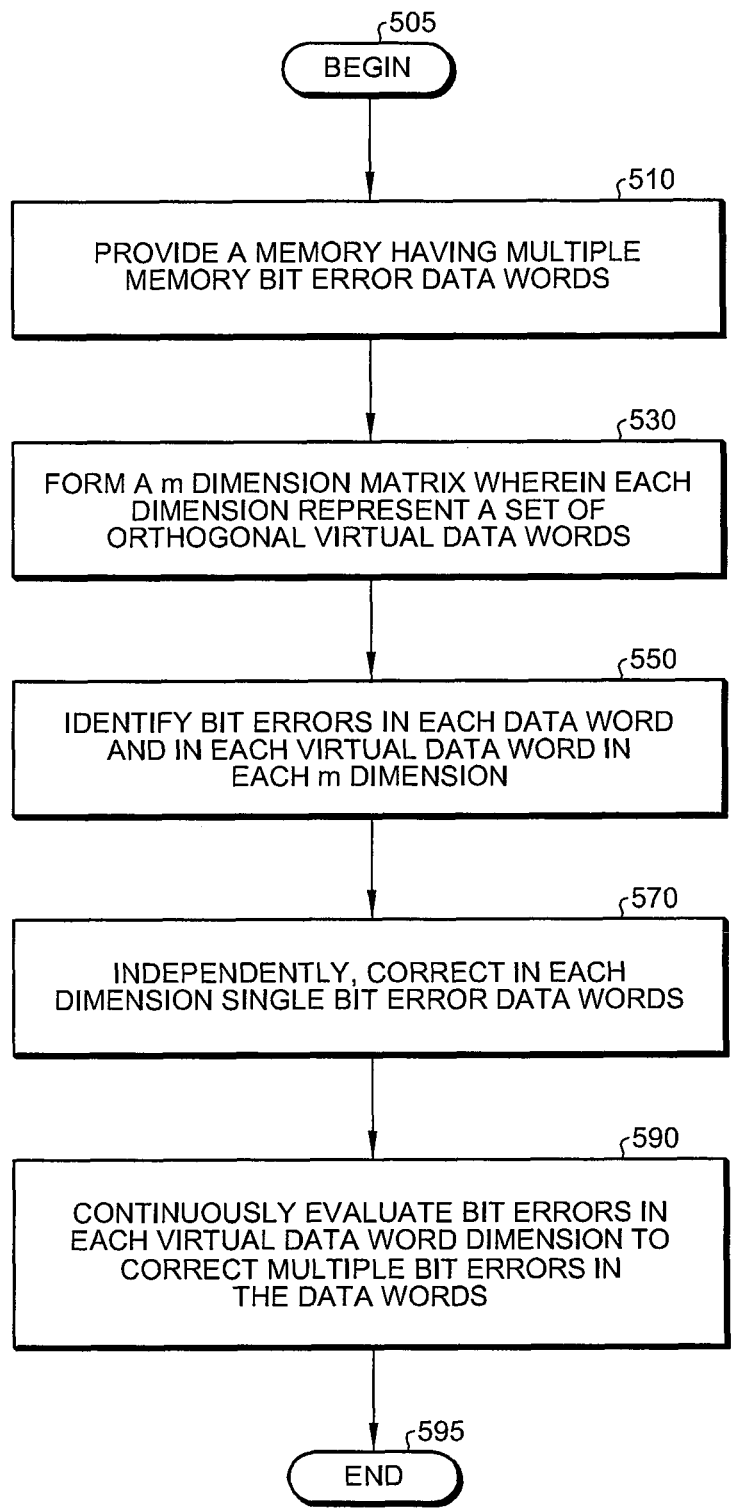
FIG. 6 is flowchart of one method embodiment for detecting and correcting multiple data word bit errors using a multi-dimensional virtual data array.

FIG. 6 is a flowchart of one method embodiment according to the present invention for multiple bit error correction, using multiple independent correction words orthogonal to the data. As shown, the process 605 begins with a memory being provided having multiple bit errors 610. As one of ordinary skill in the relevant art can appreciate, memory is comprised of a plurality of memory cells that are physically arranged in a matrix. Using the matrix, a physical address can be determined for the bits, memory cells, that comprise a particular data word. Thus, for example, an 8 bit data word may be associated with a portion of memory cells on a particular row of the memory. Each memory cell represents a bit.

As stated in FIG. 6, the present invention begins with the understanding that within a particular piece of memory, one or more of the memory cells is erroneously holding the wrong value. Said another way, there exists within the memory, memory cells that indicate a value of "one" when they should be a "zero", or a "zero" when they should be a "one". When more than one of these erroneous memory cells is associated with the same word, then that word is said to possess multiple bit errors.

The present invention resolves these multiple bit error words by forming an m-dimensional array, or matrix of data words wherein each dimension m represents a set of orthogonal virtual data words 630. Thus, for a two dimensional matrix, an orthogonal virtual word is associated with each bit of a data word in the memory. According to other embodiments of the present invention, the size of each orthogonal word is independent of that of the data word, or the word to which it is orthogonal. Furthermore, the virtual data word is logically created such that the actual memory cell location of each bit of the virtual data word is highly dispersed throughout the memory.

Once the array has been formed, bit errors are identified in each data word and in each virtual data word of each dimension 650. Once detected, various and independent EDAC techniques are employed to correct the bit errors in the memory 670. Thereafter, the data words, both physical and virtual, are continuously evaluated to identify and correct bit errors 690. By doing this identification, evaluation, and correction in the background, and utilizing a unique data bus for each dimension of the matrix, each EDAC can be independently chosen and independently implemented.

The present invention utilizes independent and logically created virtual data words orthogonal to a prior dimensional data word so as to detect and correct bit errors. By logically forming orthogonal data words, multiple bit errors can be isolated and corrected. This correction can be done at various dimensional levels using various and independent techniques, and at independently chosen frequencies. By doing so, the present invention reduces the number of EDAC check bits required to correct MBEs while improving the ability to detect and correct the same errors. Moreover, the user's ability to interact with the data stored in the data is not affected.

In another embodiment, the present invention can be implemented in software as executed by a central processing unit. Software programming code, which can embody the present invention is typically accessed by a microprocessor from long-term, persistent storage media of some type, such as a flash drive or hard drive. The software programming code may be embodied in any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures, and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device in the form of a conventional personal computer, a personal communication device or the like, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer, such as magnetic cassettes, flash memory cards, digital video disks, random access memories (RAMs), read-only memories (ROMs) and the like may also be used in the exemplary operating environment.

A number of program modules may be stored on the hard disk, magnetic disk, ROM or RAM, including an operating system, one or more application programs or software portions, other program modules, and program data. A user may enter commands and information into the personal computer through input devices such as a keyboard and pointing device. Other input devices may include a microphone, joystick, game pad, satellite dish, scanner or the like. These and other input devices are often connected to the processing unit through a serial port interface that is coupled to the system bus, but may be connected by other interfaces, such as a parallel port, game port or universal serial bus (USB). A monitor or other type of display device may also be connected to the system bus via an interface, such as a video adapter.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

While there have been described above the principles of the present invention in conjunction with a system and method for multiple bit data error detection and correction, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A system for memory error correction, comprising:
    a data word having one or more bit errors;
    m sets of virtual data words wherein each data word of each of m sets of virtual data words shares a single bit with a previous virtual data word of a previous set of virtual data words; and
    a check bit portion associated with the data word and a virtual check bit portion associated with each virtual data word wherein the check bit portion and the virtual check bit portions are each operable to detect or correct one or more bit errors in the respective data word and the virtual data word,
    wherein the system is configured for determining whether each virtual word in the $m^{th}$ set of virtual data words includes no more than a single bit error and is responsive to determining that each virtual data word in the $m^{th}$ set of virtual data words includes no more than a single bit error, correcting the single bit error using the virtual check bit associated with that virtual data word thereby correcting one or more bit errors in the $m^{th}-1$ virtual data word.

2. The system for memory error correction of claim 1 wherein the data word includes a plurality of bit errors.

3. The system for memory error correction of claim 1 further comprising:
    one or more additional sets of virtual data words wherein each virtual data word of each additional set of virtual data words shares a single bit with the data word; and
    virtual check bit portions associated with each virtual data word wherein the virtual check bit portions are each operable to detect or correct one or more bit errors in the virtual data word.

4. The system for memory error correction of claim 1 wherein the check bit portion and the virtual check bit portions are each operable to detect double bit errors in the data word and virtual data word respectively.

5. The system for memory error correction of claim 4 wherein double bit error detection in each data word and each virtual data word enables precise bit error identification.

6. The system for memory error correction of claim 1 wherein the data word and the virtual data words are size independent.

7. The system for memory error correction of claim 1 wherein each virtual data word is logically created.

8. The system for memory error correction of claim 7 wherein a logical mapping of a data cell associated with a virtual data word is distinct from a physical mapping of the data cell for the virtual data word.

9. The system for memory error correction of claim 1 further comprising a second set of one or more virtual data words, wherein
    the data word and the virtual data words in the second set of virtual data words are parallel to each other;
    the virtual data words in the set of virtual data words are parallel to each other; and
    the data word and the virtual data words in the second set of virtual data words are orthogonal to the virtual data words in the set of virtual data words to form a logical matrix.

10. The system for memory error correction of claim 9 further comprising a virtual check bit portion associated with each virtual data word in the second set of virtual words wherein the virtual check bit portions are each operable to detect or correct one or more bit errors in the respective virtual data word.

11. The system for memory error correction of claim 10 wherein the set of virtual data words includes virtual data words orthogonal to the check bit portion of the data word and virtual check bit portions associated with the virtual data words of the second set of virtual data words.

12. The system for memory error correction of claim 9 wherein, if errors are detected at a set of cross point bits of the logical matrix, the system is configured to correct the errors by collaboratively using respective error correction schemes of each data word and virtual data words containing the cross point bits.

13. The system for memory error correction of claim 1 wherein memory error correction operates independently from other memory operations.

14. The system for memory error correction of claim 13 wherein memory error correction frequency is independent from other memory operation frequencies.

15. The system for memory error correction of claim 1 wherein each set of virtual data words employs an error correction scheme, and wherein the error correction scheme of each set of virtual data words is independent from each other set of virtual data words.

16. The system for memory error correction of claim 1 wherein the data word and each virtual data word employs an independent error correction scheme.

17. A method for memory error correction, comprising:
    providing a data word having one or more bit errors;
    providing m sets of virtual data words wherein each data word of each of m sets of virtual data words shares a single bit with a previous virtual data word of a previous set of virtual data words;
    forming a logical matrix with the data word and the set of virtual data words;
    associating a check bit portion with each data word and associating a virtual check bit portion with each virtual data word; and
    determining whether each virtual word in the $m^{th}$ set of virtual data words includes no more than a single bit error and responsive to determining that each virtual data word in the $m^{th}$ set of virtual data words includes no more than a single bit error, correcting the single bit error using the virtual check bit associated with that virtual data word thereby correcting one or more bit errors in the $m^{th}-1$ virtual data word.

18. The method for memory error correction of claim 17 wherein the data word includes a plurality of errors.

19. The method for memory error correction of claim 17 responsive to determining existence of multiple bit errors in at least one virtual data word, identifying a location for each bit error.

20. The method for memory error correction of claim 17 wherein the data word and each virtual data word of each virtual data word set are size independent.

21. The method for memory error correction of claim 17 wherein each virtual data word is logically created.

22. The method for memory error correction of claim 17 wherein correcting bit errors occurs independent of data word access.

23. The method for memory error correction of claim 17 wherein correcting bit errors includes implementing an error correction scheme, the error correction scheme of each set of virtual data words is independent of each other set of virtual data words.

24. An apparatus for bit storage, comprising:

a data word comprising one or more bits;

m sets of virtual data words wherein each data word of each of m sets of virtual data words shares a single bit with a previous virtual data word of a previous set of virtual data words;

one or more check bit portions associated with the data word and each parallel virtual data word comprising one or more bits;

one or more orthogonal virtual data words comprising bits logically mapped from the bits associated with the data word or the parallel virtual data words or the check bit portions; and one or more orthogonal virtual check bit portions associated with each orthogonal virtual data word comprising one or more bits, wherein the apparatus is configured for determining whether each virtual word in the $m^{th}$ set of virtual data words includes no more than a single bit error and responsive to determining that each virtual data word in the $m^{th}$ set of virtual data words includes no more than a single bit error, correcting the single bit error using the virtual check bit associated with that virtual data word thereby correcting one or more bit errors in the $m^{th}-1$ virtual data word.

25. The apparatus for bit storage of claim 24, further comprising one or more parallel virtual data words comprising bits logically mapped from the bits associated with the orthogonal virtual check bit portions.

* * * * *